United States Patent [19]
Morisaki

[11] Patent Number: 5,946,107
[45] Date of Patent: Aug. 31, 1999

[54] FACSIMILE APPARATUS USING SHARED DATA CONVERTING DEVICE

[75] Inventor: Hiroshi Morisaki, Nishikasugai-gun, Japan

[73] Assignee: Brother Kogyo Kabushiki Kaisha, Nagoya, Japan

[21] Appl. No.: 08/990,530

[22] Filed: Dec. 15, 1997

[30] Foreign Application Priority Data

Feb. 7, 1997 [JP] Japan ..................................... 9-025358
Feb. 7, 1997 [JP] Japan ..................................... 9-025360

[51] Int. Cl.$^6$ .............................. H04N 1/40; H04N 1/00; H04N 1/32
[52] U.S. Cl. ........................................... 358/444; 358/468
[58] Field of Search .................................... 358/444, 443, 358/400, 403

[56] References Cited

U.S. PATENT DOCUMENTS 5,345,316   9/1994   Ozaki ..................................... 358/426

*Primary Examiner*—Joseph Mancuso
*Assistant Examiner*—Coulter Henry
*Attorney, Agent, or Firm*—Oliff & Berridge, PLC

[57] ABSTRACT

When a memory read and a facsimile transmission operation are concurrently performed, first it is determined in the memory read operation whether a converting block is available based on the state of an in-use flag. If the converting block is unavailable, namely the converting block is in use by the facsimile transmission operation, the memory read operation goes in a standby state. When the converting block is available, namely the in-use flag is reset on the facsimile transmission operation side, the in-use flag is set indicating that the converting block is in use by the memory read operation. Then, one line of document data is coded and stored in an accumulated memory. Next, after the in-use flag is reset, the above-mentioned process is repeated until all of the document data has been coded. This allows the converting block to be alternately used by the memory read and the facsimile transmission operations.

20 Claims, 9 Drawing Sheets

FACSIMILE APPARATUS USING SHARED DATA CONVERTING DEVICE

BACKGROUND OF THE INVENTION

1. Field of Invention

The present invention relates to a facsimile apparatus capable of performing a memory read operation for storing an image from a document into memory and performing transmission/reception processing for transmitting/receiving facsimile data via a communication line, simultaneously.

2. Description of Related Art

Conventionally, a facsimile apparatus reads an image from a document with a scanner, converts this read document data into facsimile data for communication by coding (compressing) the read document data, and transmits the compressed data to a destination facsimile apparatus. Recently, a proposition has been made in which coded facsimile data is stored in a predetermined storage memory and the stored facsimile data is transmitted upon connection to a destination facsimile apparatus.

The process (hereinafter referred to as memory reading) of read document data, converting the document data into facsimile data, and storing the facsimile data, can be executed inside a facsimile apparatus without using a communication line. Consequently, a so-called dual access type facsimile apparatus is proposed in which memory reading and facsimile data transmission/reception can be performed simultaneously.

Meanwhile, transmission data, data such as name of the source, destination, and transmission date are attached to the facsimile data to be transmitted. A similar coding process is performed to the transmission data. At the facsimile apparatus on the other end of the line, the facsimile data is received and decoded (decompressed) for conversion into image data to be printed.

Compression and decompression for transmission/reception of facsimile data can be performed by one conversion device. For example, a coding circuit or a decoding circuit may be shared for both coding and decoding.

However, because the dual access type facsimile apparatus may perform memory reading and transmission/reception of facsimile data simultaneously, both the converting device for memory reading and the converting device for facsimile data transmission/reception may be required. Therefore, since the dual access type facsimile apparatus requires two or more converting devices having coding and decoding capabilities, the cost of the facsimile apparatus is increased.

It is therefore an object of the invention to minimize the number of converting devices necessary for coding and decoding in a dual access type facsimile apparatus to lower the cost thereof.

SUMMARY OF THE INVENTION

According to a first embodiment of the invention, there is provided a facsimile apparatus comprising a document data converting device for converting document data into facsimile data for communication, a storage device for storing the facsimile data; and a transmission data attaching device for converting, at the time of transmission of the facsimile data, data associated with the transmission status into facsimile data and attaching the converted data to the facsimile data stored in the storage device. When the document data converting device and the transmission data attaching device use a shared converting device for performing the conversion simultaneously, the document converting device and the transmission data attaching device use the shared converting device alternately.

In the invention thus structured, the document data conversion device converts document data into facsimile data for communication, which is stored in the storage device. The transmission data attaching device converts, at transmission of the facsimile data, data (for example, names of source and destination and a transmission date, which are hereafter referred to as transmission data) associated with a status of the transmission into facsimile data and attaching the converted data to the facsimile data stored in the storage device.

The document data converting device and the transmission data attaching device use a shared converting device for performing the conversion. When the document data converting device and the transmission data attaching device operate simultaneously, the document converting device and the transmission data attaching device alternately use the shared converting device. Hence, both memory reading and facsimile transmission can be performed by one converting device. This novel structure reduces the number of converting devices used in the dual access type facsimile apparatus, thereby lowering the apparatus cost.

In carrying out the invention and according to a second aspect thereof, there is provided a facsimile apparatus comprising: a document data converting device for converting document data into facsimile data for communication; a storage device for storing the facsimile data; and a reception data converting device for converting received facsimile data into image data for printing.

When the document data converting device and the reception data converting device perform the conversion using a shared converting device and the document data converting device and the reception data converting device operate simultaneously, the document data converting device and the reception data converting device alternately use the shared converting device.

In the facsimile apparatus thus structured, the document data converting device converts document data into facsimile data for communication via the converting device and the converted facsimile data is stored in the storage device. The reception data converting device converts received facsimile data into image data for printing via the above-mentioned converting device.

The document data converting device and the reception data converting device use the shared converting device for conversion and, when the document data converting device and the reception data converting device operate simultaneously, both devices alternately use the shared converting device. Hence, both memory reading and facsimile reception can be performed by one converting device. This novel structure reduces the number of converting devices used in the dual access type facsimile apparatus, thereby lowering the cost of the facsimile apparatus.

In carrying out the invention and according to a third aspect thereof, there is provided a facsimile apparatus in which a shared converting device is alternately used every time data of a predetermined quantity is processed. When data of a predetermined quantity is processed, data conversion processing is discontinued at an appropriate division point. Hence, the data conversion process using the converting device can be more smoothly performed. This novel structure further enhances the reliability of the facsimile apparatus.

In carrying out the invention and according to a fourth aspect thereof, there is provided a facsimile apparatus in which the data conversion process is alternately performed in one line units by the shared converting device. This novel structure performs the data conversion process more smoothly and further enhances the reliability of the facsimile apparatus.

In carrying out the invention and according to a fifth aspect thereof, there is provided a facsimile apparatus comprising: a document data converting device for converting document data into facsimile data for communication; a storage device for storing the facsimile data; and a transmission data attaching device for attaching data associated with status of the transmission, onto the facsimile data at the time of transmission.

When the document data converting device and the transmission data attaching device use the shared converting device and operate simultaneously, the shared converting device is alternately used by both devices with the transmission data attaching device having priority.

In the facsimile apparatus thus structured, the document data conversion device converts document data into facsimile data for communication, which is stored in the storage device. The transmission data attaching device converts, at transmission of the facsimile data, transmission data associated with the status of the transmission into facsimile data for communication and attaching the converted data to the facsimile data stored in the storage device.

The document data converting device and the transmission data attaching device use the shared converting device and, when operated simultaneously, the shared converting device is alternately used by both devices with the transmission data attaching device having priority. Hence, both memory reading and facsimile transmission can be performed by one converting device. This novel structure reduces the number of converting devices used in the dual access type facsimile apparatus and thus, reduces the cost of the facsimile apparatus.

When the shared converting device is alternately used, the transmission data attaching device directly associated with facsimile data transmission has priority, so that facsimile data transmission/reception is not interrupted.

In carrying out the invention and according to a sixth aspect thereof, there is provided a facsimile apparatus comprising: a document data converting device for converting document data into facsimile data for communication; a storage device for storing the facsimile data; and a reception data converting device for converting the received facsimile data into image data for printing.

When the document data converting device and the reception data converting device use the shared converting device and operate simultaneously, the shared converting device is alternately used by both devices with the reception data converting device having priority.

In the facsimile apparatus thus structured, the document data converting device converts document data into facsimile data for communication via the shared converting device and the converted facsimile data is stored in the storage device. The reception data converting device converts the received facsimile data into image data for printing via the shared converting device.

The document data converting device and the reception data converting device use the shared converting device, and when the document data converting device and the reception data converting device operate simultaneously, the shared converting device is alternately used by both devices with the reception data converting device having priority. Hence, both memory reading and facsimile reception can be performed by one converting device. This novel structure reduces the number of converting devices used in the dual access type facsimile apparatus, thereby lowering the cost of the facsimile apparatus.

During the alternating use of the shared converting device, the reception data converting device directly associated with facsimile data reception is preferred, so that transmission/reception of facsimile data is not interrupted.

In carrying out the invention and according to a seventh aspect thereof, there is provided a facsimile apparatus, in which the shared converting device is alternately used for a predetermined time and the time allocated to the document data converting means is shorter than the time allocated to the transmission data attaching device or the reception data converting device, thereby providing priority to the transmission data attaching device and the reception data converting device for using the shared converting device.

In the facsimile apparatus thus structured, the shared converting device allocates less time to the document data converting device than the time allocated to the transmission data attaching device or the reception data converting device (which are hereafter generically referred to as facsimile transmission/reception device), directly associated with facsimile data transmission/reception, thereby giving priority to the facsimile data transmission/reception. Hence, if the data (a document for example) to be processed by the document converting device or facsimile transmission/reception device is complicated and a predetermined quantity (for example, one line) requires a long time to process, the other devices can use the shared converting device upon passing of the time allocated to the device currently operating. This novel structure operates each device with more reliability.

In carrying out the invention and according to an eighth aspect thereof, there is provided a facsimile apparatus in which the shared converting device is alternately used for processing data of a predetermined quantity. The data of a predetermined quantity allocated to the document data converting device is smaller than that allocated to the transmission data attaching device or the reception data converting device, thereby providing priority to the transmission data attaching device and the reception data converting device for using the shared converting device.

In the facsimile apparatus thus structured, the quantity of data to be processed by the shared converting device allocated to the document data converting device is smaller than that allocated to the facsimile transmission/reception device, thereby providing priority to the facsimile transmission/ reception device for using the shared converting device. Hence, the ratio of the data processing quantities of the document data converting device and the facsimile transmission/reception device can be constantly maintained. In addition, usage of the shared converting device can be switched by a well divided data processing quantity.

Consequently, according to the facsimile apparatus, since the balance of data processing quantities can be properly maintained, the processing reliability can be further enhanced.

BRIEF DESCRIPTION OF THE DRAWINGS

Embodiments of the invention will be described in detail with reference to the following figures wherein.

DETAILED DESCRIPTION OF PREFERRED EMBODIMENTS

Figure 1:
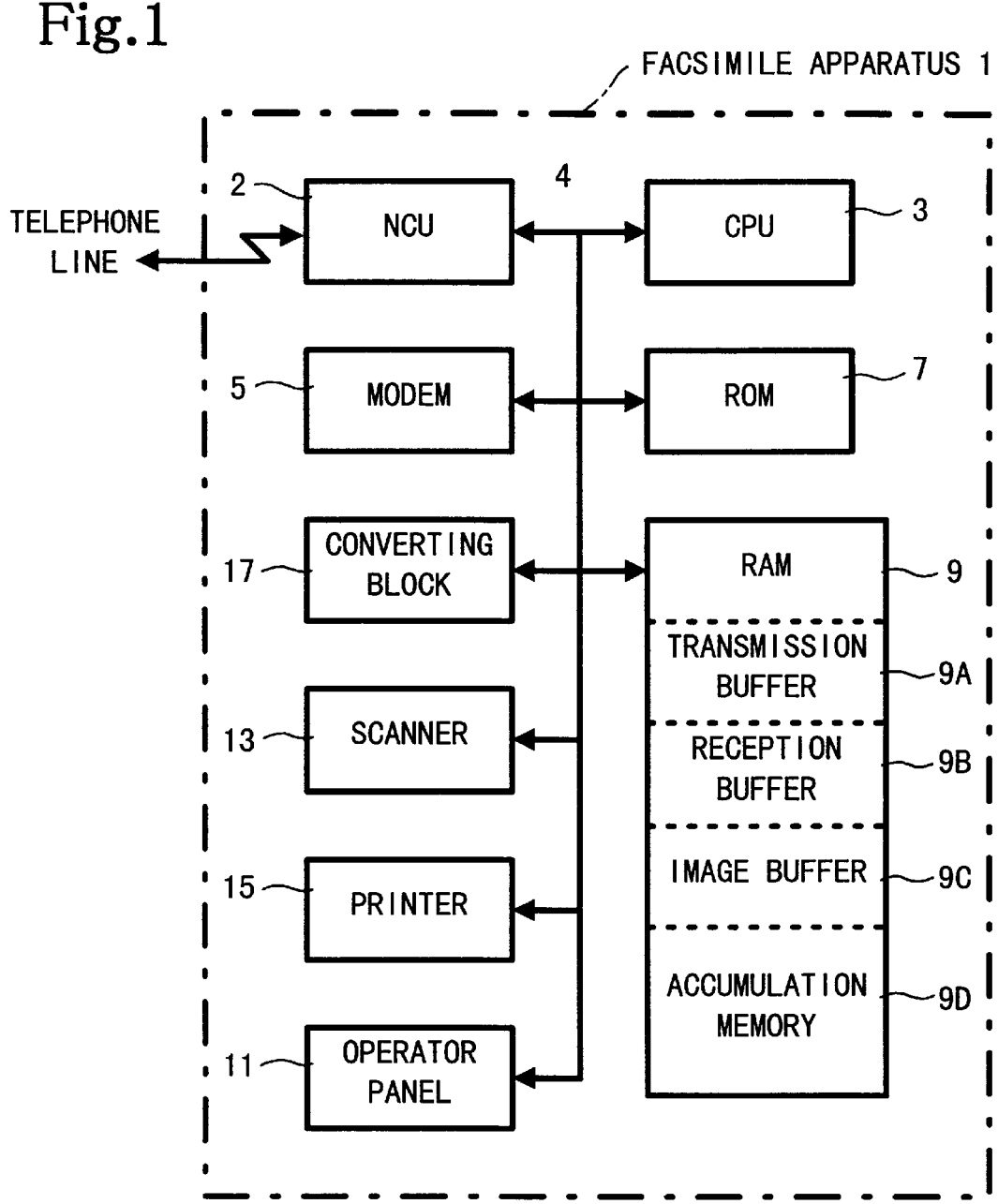
FIG. 1 is a general block diagram illustrating the facsimile apparatus to which the invention is applied.

The following describes a first embodiment of the invention with reference to the relative drawing. FIG. 1 shows a general block diagram of a facsimile apparatus 1 for a first embodiment of the invention. The facsimile apparatus 1 is a so-called dual access type facsimile apparatus capable of simultaneously performing 1) memory read processing for reading an image on a document, coding the read image, and storing the coded data into a storage device, and 2) coding and decoding involved in transmission/reception of facsimile data.

As shown in FIG. 1, the facsimile apparatus 1 is connected to a telephone line via a network control unit (NCU) 2 for performing line control. A CPU 3 central to the facsimile apparatus 1 is connected to the NCU 2 and the following devices via a bus line 4 to execute a facsimile operation, namely, data communication according to a predetermined communication procedure.

A modem 5 modulates and demodulates facsimile data for transmission and, at the same time, transmits/receives various procedural signals for transmission control. A ROM 7 is a memory for storing various control programs (described below), a cover page to be attached to facsimile data to be transmitted, and a transmission header format in a rewrite-disabled manner, for example. A RAM 9 is a memory for temporarily storing various pieces of data to be used at the execution of control and has a transmission buffer 9A for temporarily storing data to be transmitted over a telephone line, a reception buffer 9B for temporarily storing data received over the telephone line, an image buffer 9C for storing image data to be printed in bit map format, and an accumulation memory 9D for accumulating coded facsimile data to be transmitted.

An operator panel 11 displays the operating state of the facsimile 1. An operator may perform various operations using this operator panel which may comprise various keys, such as numeric keys, function keys, and an abbreviated dial registration key, for example (these keys not shown). An image scanner 13 optically reads a document image to be transmitted, comprising, for example, a light emitting block for radiating a laser beam onto document in a scanning manner and a light receiving block for receiving a reflected light from document to form a bit image of the document image. For the image scanner 13, a known CCD may be used. A printer 15 records an image corresponding to the received facsimile data onto a recording paper (not shown). For printing, electrostatic electronic photograph recording is used in which a latent image is formed by a laser beam onto a photosensitive body and the formed latent image is developed by toner and transferred to recording paper.

Converting block 17 codes the bit-mapped image data read by the image scanner 13 and converts the coded image data into facsimile data for communication. The converting block 17 also decodes and converts received facsimile data into image data for printing. The converting block may include a coding circuit or a decoding circuit performing both coding and decoding image data.

Thus, the CPU 3 is connected to the NCU 2, the modem 5, the ROM 7, the RAM 9, the operator panel 11, the image scanner 13, the printer 15, and the converting block 17. The CPU 3 through the transmission/reception of signals with these devices, performs (1) a memory read operation, (2) facsimile transmission, (3) facsimile reception, among others. These operations are described in detail below.

(1) Memory Read Operation

When an operator sets a document onto the image scanner 13, operates the operator panel 11 to enter necessary information, and specifies a destination, the CPU 3 performs a memory read operation according to the following procedure.

First, a document image is read by the image scanner page-by-page as bit-mapped image data and this image data is stored in the image buffer 9C. Next, the stored image data is coded by the converting block 17 and the coded data is converted into facsimile data and stored in the accumulation memory 9D.

(2) Facsimile Transmission

When the facsimile data has been stored in the accumulation memory 9D by the above-mentioned memory read operation, the CPU 3 performs a facsimile transmission according to the following procedure.

First, current date (year, month, day, hour, minute, and second) is captured from a clock (not shown) incorporated in the CPU 3. Data (name, telephone number, and so on) associated with transmission source is captured from a predetermined storage area in the RAM 9. Further, based on the operation of the operator panel 11, a name, a line number, and so on of a transmission destination are captured. Next, data associated with the date, transmission source and destination (hereafter referred to as transmission data) is captured and coded by the converting block 17 and attached to the facsimile data stored in the accumulation memory 9D.

Then, after establishing communication with the destination facsimile apparatus by transmission/reception of signals according to a predetermined protocol via the NCU 2 and the telephone line, the transmission data and the facsimile data are read from the accumulation memory 9D and transmitted via the transmission buffer 9A.

It should be noted that the transmission data may be attached to the facsimile data in the form of a so-called cover page using one page or in the form of a so-called transmission header placed at the top of the image corresponding to the facsimile data. The operator can set the selection of these forms or opt to not attach the transmission data by using the operator panel 11, for example.

(3) Facsimile Reception

When receiving facsimile data over the telephone line via the NCU 2, the CPU 3 performs facsimile reception according to the following procedure.

First, after a call terminates, communication is established with the facsimile apparatus of transmission source by transmitting/receiving signals according to a predetermined protocol. Next, facsimile data is received. The received facsimile data is stored in the reception buffer 9B, decoded by the converting block 17, and converted into image data for printing. Then, the resultant image data is stored in the image buffer 9C as one page of bit-mapped image data. The image data stored in the image buffer 9C is printed by the printer 15 onto printing paper.

In the facsimile apparatus 1 of the first embodiment, the above-mentioned memory reading operation and the above-mentioned facsimile transmission or reception can be performed concurrently. Concurrently performing these two processing operations requires the converting block 17 being used for each process. In the facsimile apparatus 1 of the first embodiment, the two concurrent processing operations can be performed by one converting block 17 according to the following method.

Figure 2:
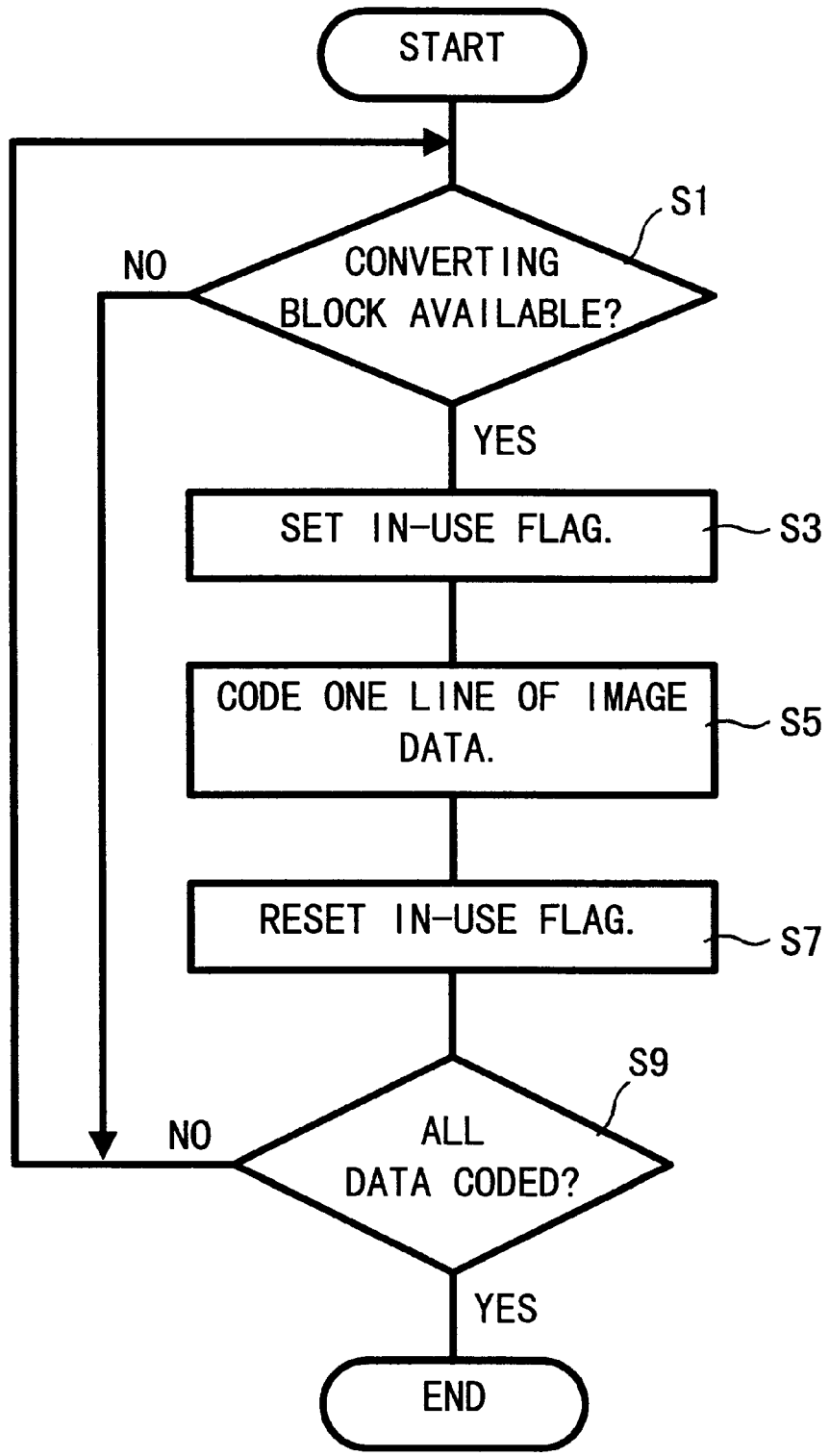
FIG. 2 is a flowchart of the memory read process in a first embodiment of the invention.
Figure 3:
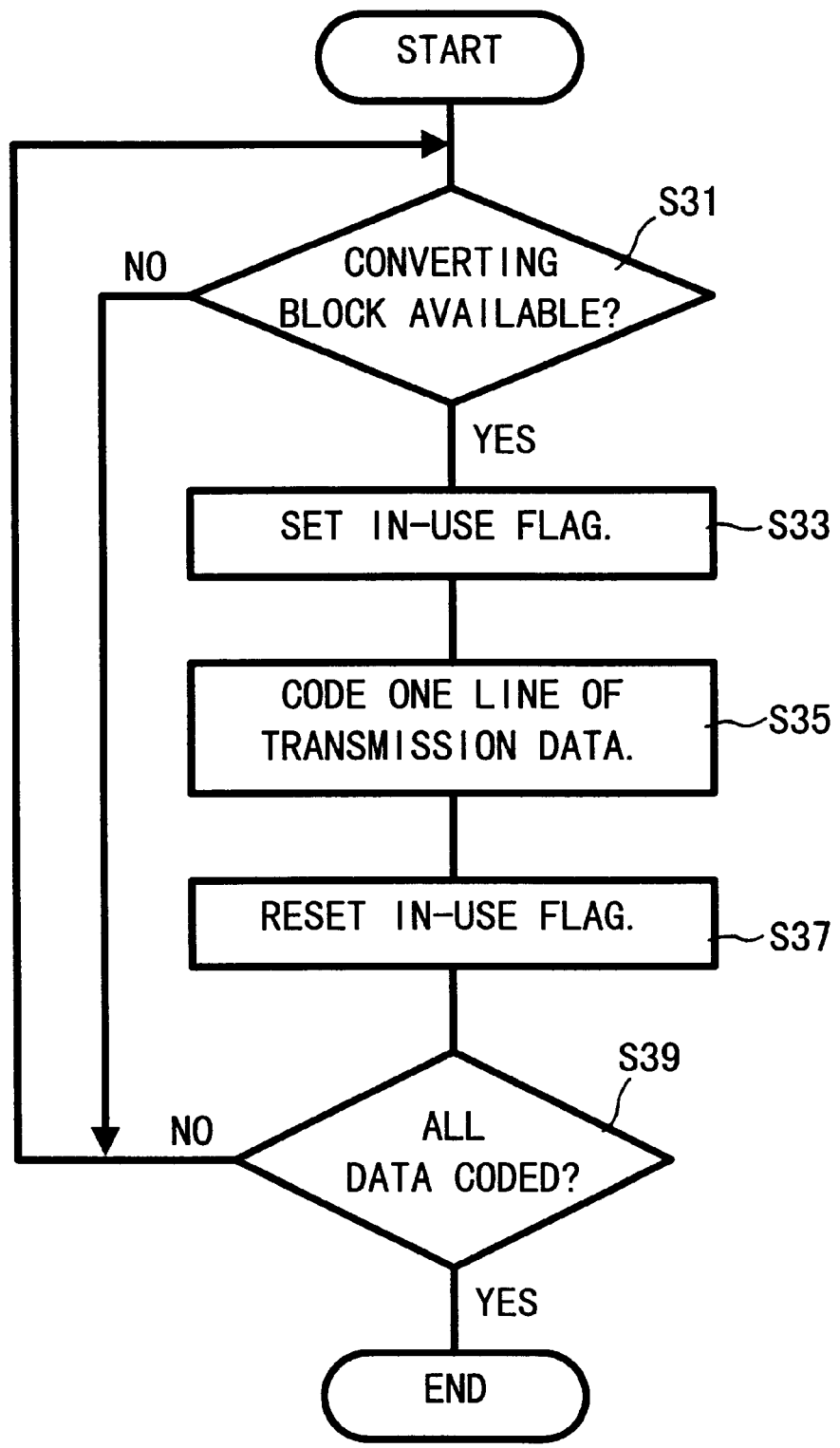
FIG. 3 is a flowchart of the facsimile transmission process in the first embodiment of the invention.

When performing the memory read operation and the facsimile transmission concurrently, the CPU 3 performs the process shown in FIGS. 2 and 3 in a multitask manner. It should be noted that FIGS. 2 and 3 show only portions associated with the use of the converting block 17 among the processes performed by the CPU 3.

In the memory read operation shown in FIG. 2, first it is determined in step S1 whether the converting block 17 is available. This decision is made based on a state of an in-use flag (described below) provided in the RAM 9. If the converting block 17 is found to be unavailable (step S1: NO), namely if the converting block 17 is in use performing a concurrent facsimile transmission, the process waits at step S1. When the converting block 17 is made available (step S1: YES), the process goes to step S3. In step S3, the in-use flag, indicating that the converting block 17 is in use, is set to a predetermined area in the RAM 9. In step S5, one line of image data read by the image scanner 13 is coded and stored in the accumulation memory 9D. Then, the in-use flag is reset in step S7. In step S9, it is determined whether all document data has been coded. If all document data has not yet been coded (step S9: NO), the process goes back to step S1 to repeat the above-mentioned process (steps S1–S7). If all document data has been coded, (step S9: YES), the memory read process ends.

In addition, as shown in FIG. 3, the facsimile transmission process waits until the converting block 17 is made available after the memory read process (step S31). When the in-use flag is reset in step S7 in the memory read process and the converting block 17 is made available (step S31: YES), the in-use flag for facsimile transmission is set (step S33). Then, one line of the transmission data is coded, the coded transmission data is attached to the above-mentioned facsimile data (step S35), and the in-use flag is reset (step S37). In step S39, it is determined whether the transmission data has all been coded. If all the transmission data has not been coded (step S39: NO), the process goes back to step S31 to repeat the above-mentioned process (steps S31–S37). When the transmission data has all been coded and attached to the facsimile data, the processing ends (step S39). The facsimile data with the transmission data attached is transmitted to the destination facsimile apparatus according to a predetermined communication protocol.

Thus, when the memory read and the facsimile transmission processes are performed concurrently, the in-use flag is set in the RAM 9 while one process performs coding (in step S5 or S35), while the other process is put in a standby state (in step S31 or S1). After one line of data is coded, the in-use flag is reset (step S7 or S37), and coding begins for the other process (step S35 or S5). Thus, coding of document image and transmission data are alternately performed every other line. When one process is completed before the other, the decision is always YES in step S1 or S31, so that the converting block 17 is always available for coding in the other process. Consequently, coding in the other process can be performed continuously thereafter.

Figure 4:
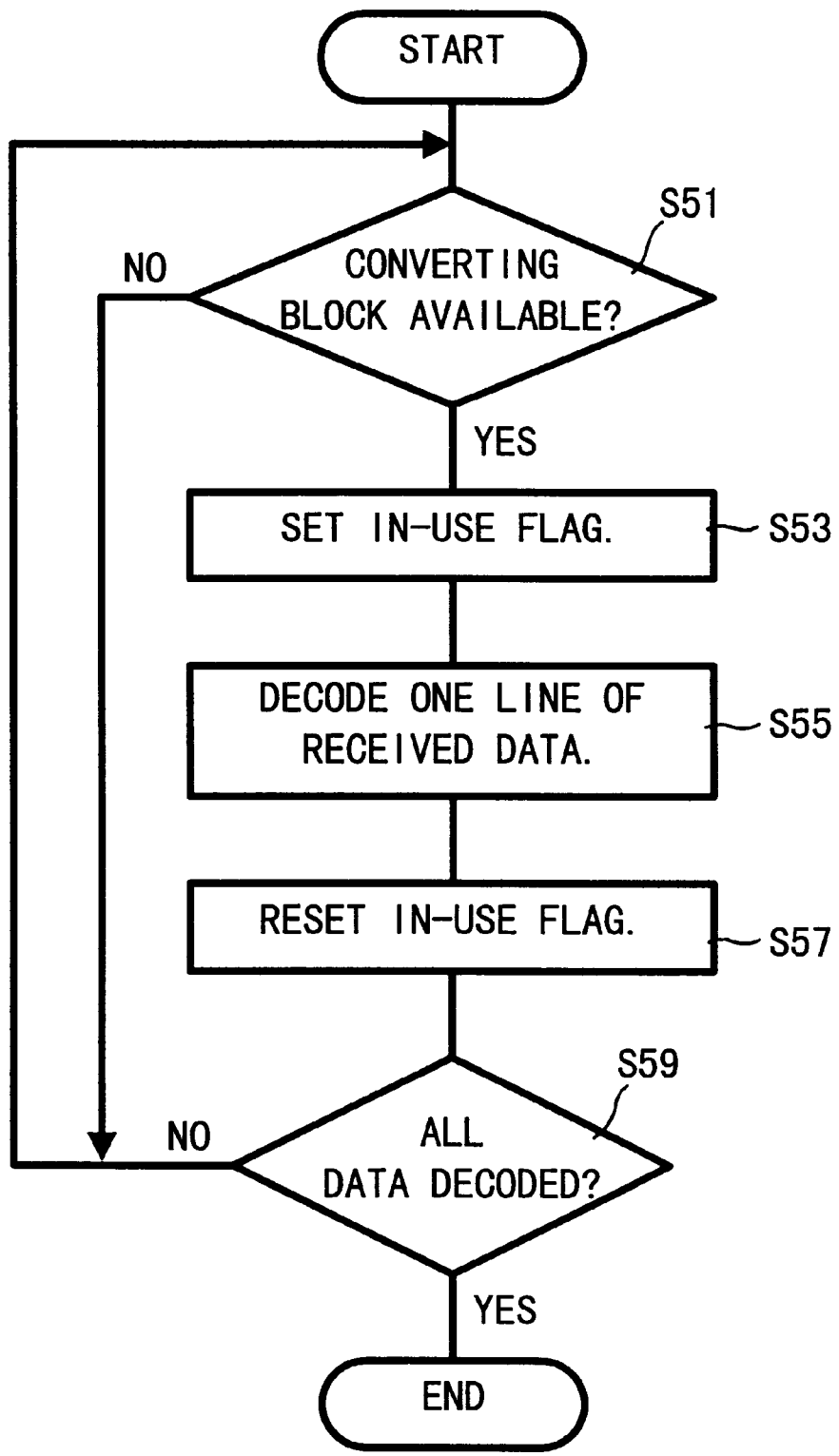
FIG. 4 is a flowchart of the facsimile reception process in the first embodiment of the invention.

When the memory read and the facsimile reception processes are performed concurrently, the CPU 3 performs the processing operations shown in FIGS. 2 and 4 in a multitask manner. Since the memory read process shown in FIG. 2 has been discussed above, a description of the facsimile receiving process shown in FIG. 4 will be given below.

First, after a call terminates, communication is established with the source facsimile apparatus by transmitting and receiving signals according to a predetermined protocol. Then, the facsimile reception process begins. In this process, the process checks the in-use flag set in the RAM 9 to determine whether the converting block 17 is available (step S51). When the converting block 17 is available (step S51: YES), the in-use flag is set (step S53). Then, one line of the facsimile data received over the telephone line is decoded and stored in the image buffer 9C (step S55) and the in-use flag is reset (step S57). Next, it is determined whether all of the facsimile data received in step S59 has been decoded. To be specific, it is determined whether any facsimile data that has not been decoded remains in the reception buffer 9B. If all received facsimile data has not been decoded (step S59: NO), the process goes back to step S51 to repeat the above-mentioned processing operations (steps S51–S57). When all the received facsimile data has been decoded, the facsimile reception process ends (step S59).

In addition, when the memory read and the facsimile transmission/reception processes are performed concurrently, coding of the document data and decoding of the reception data can be alternately performed every other line as in the above-mentioned concurrent process of the memory read and the facsimile transmission operations. Further, when either of the document data coding or the reception data decoding processes is completed before the other, the decision in step S1 or S51 is always YES, so that the converting block 17 is always available for the coding or decoding in the other process. Consequently, the coding or decoding in the other process can be performed continuously thereafter.

Thus, in the facsimile apparatus 1 of the first embodiment, coding or decoding is performed through the use of the shared converting block 17 in each of (1) memory read operation, (2) facsimile transmission, and (3) facsimile reception processes. When the coding for the memory read and facsimile transmission process or decoding for the facsimile reception process are concurrently performed, the converting block 17 alternates coding and decoding one line at a time. Hence, one converting block 17 can perform the memory read and the facsimile transmission or reception process concurrently. Consequently, despite being a dual access type facsimile device, the facsimile apparatus 1 can be produced at a significantly reduced manufacturing cost.

Further, in a dual access mode, the converting block 17 is alternately used by different processes every other line. Consequently, the coding or decoding process begins and ends at commonly accepted break points (e.g., a line, paragraph, page, etc.) and therefore proceeds smoothly. This novel structure enhances the reliability of the facsimile apparatus 1.

Still further, when one of the concurrent processing operations comes to an end, the other concurrent processing operation is performed without delay, thereby enhancing the processing speed.

In the facsimile apparatus 1 of the first embodiment, the two dual access operations of memory reading and facsimile reception or memory reading and facsimile transmission, are executable. It will be apparent that only one dual access operation is executable. It will also be apparent that the converting block 17 can be used alternately for coding and decoding a plurality of lines or by various other manners, such as time division.

A description of the second preferred embodiment of the invention is set forth below in the first embodiment, the time necessary for coding one line of image data for memory reading by the converting block 17 is almost the same as the time necessary for coding one line of transmission data for transmission or the time necessary for decoding one line of facsimile data at reception. At this point, the time for coding or decoding one line of data does not change. On the other hand, a facsimile data transmission or reception must be performed in a predetermined time according to a predetermined protocol over a telephone line. Therefore, if the converting block 17 is shared by memory read and facsimile transmission or reception operations, as in the first embodiment, coding or decoding by the converting block 17 for facsimile transmission/reception cannot proceed with the speed of facsimile data transmission/reception between the facsimile apparatus and the telephone line, possibly dropping part of facsimile data to be transmitted or received.

The facsimile apparatus according to the second preferred embodiment solves the above problem as shown in FIG. 1, the structure of the facsimile apparatus 1 of the second preferred embodiment is generally the same as that of the facsimile apparatus 1 of the first embodiment and therefore the description of the structure of the second embodiment will be omitted. The facsimile apparatus 1 of the second preferred embodiment uses a different control method from the facsimile apparatus of the first embodiment. The control method of the facsimile apparatus of the second preferred embodiment is described below.

In the facsimile apparatus of the second preferred embodiment, (1) the memory read operation, (2) the facsimile transmission, and (3) the facsimile reception processes are performed as in the facsimile apparatus of the first embodiment.

Figure 5:
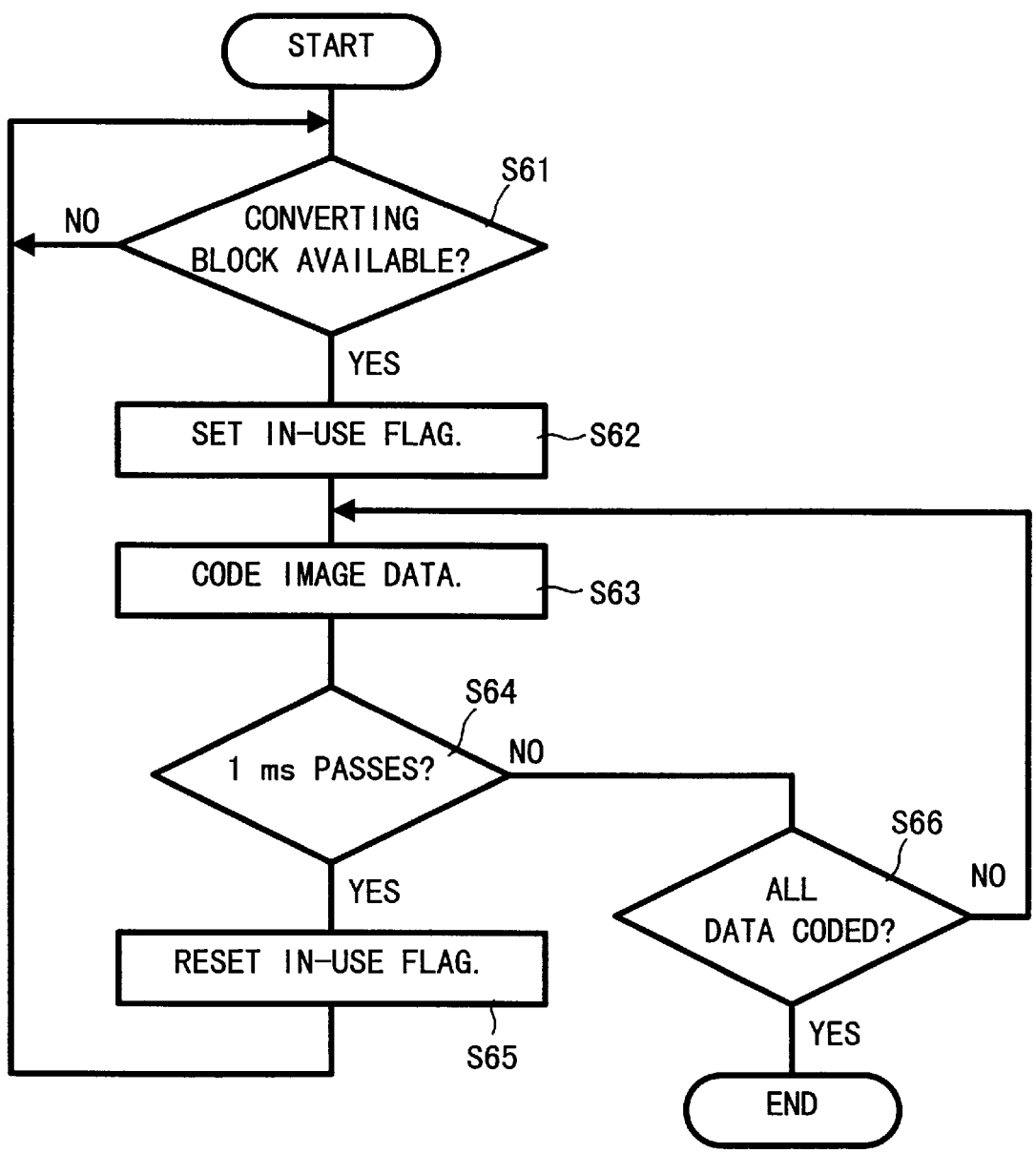
FIG. 5 is a flowchart of the memory read process in a second preferred embodiment of the invention.
Figure 6:
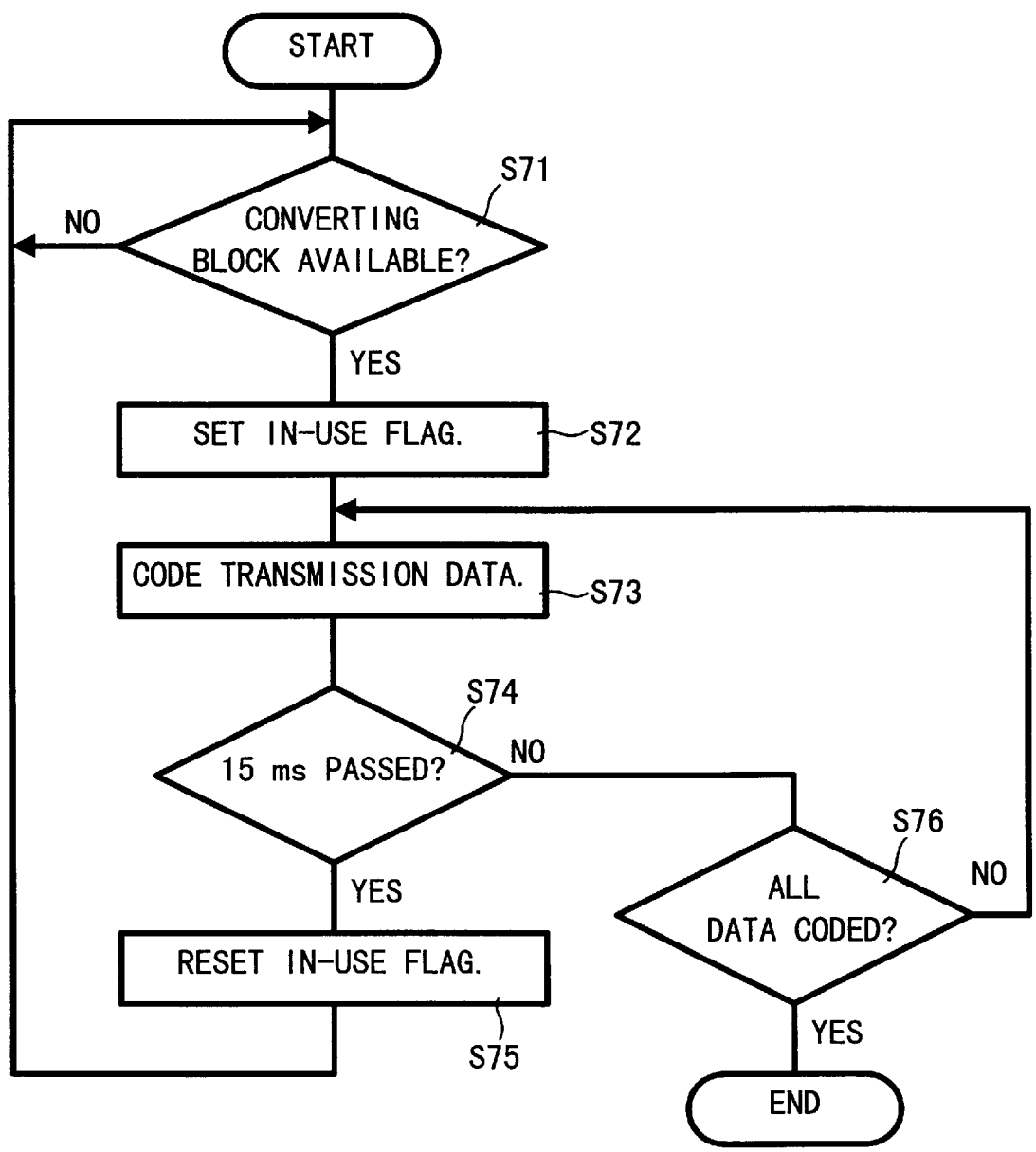
FIG. 6 is a flowchart of the facsimile transmission process in the second preferred embodiment of the invention.

If a memory read operation and a facsimile transmission are concurrently performed, the CPU 3 executes the processing operations shown in FIGS. 5 and 6 in a multitask manner. It should be noted that, in this multitask processing, task switching is performed every 1/60 second (about 16 ms).

Figure 7:
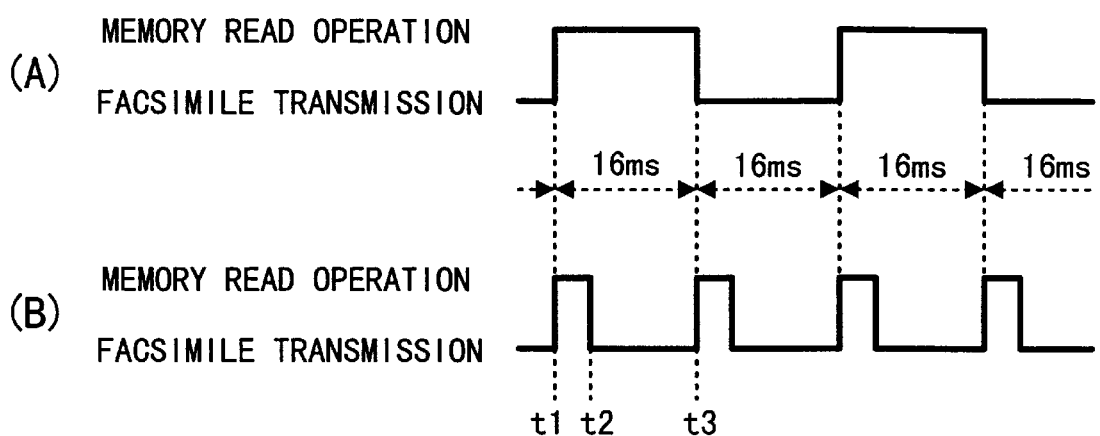
FIG. 7 is a timing chart for the memory read and the facsimile transmission process in the second preferred embodiment of the invention.

This timing is described based on FIGS. 7A and 7B. FIG. 7A is a timing chart indicative of a time allocation between memory read and facsimile transmission operations which are switched in a time division manner. In this case, the memory read and the facsimile transmission operations are alternately performed in a switching time of 16 ms, the uniform time being allocated to each of the operations.

In a timing chart of FIG. 7B for the second preferred embodiment, the times allocated to these processing operations are not uniform.

To be specific, when the converting block 17 becomes available for memory read processing, the in-use flag is set at time t1, and coding of image data begins. If the CPU 3 managing task control determines that a predetermined time (in the example of FIG. 4, about 1 ms) has passed, the CPU 3 forcibly resets the in-use flag at that point of time. Then, concurrently operating facsimile transmission processing starts at time t2. This facsimile transmission processing continues up to switching time (t3). The duration in which the facsimile transmission is performed is about 15 ms in the example shown in FIG. 7B. When 15 ms passes, the in-use flag is forcibly reset. Then, the memory read processing starts again, beginning from the operation following the image data coding last performed. Then, the next memory read processing similarly ends after 1 ms, upon which the facsimile transmission processing is forcibly started. These processing operations are then repeated.

The processing indicated by the timing chart of FIG. 7B will be further described with reference to the flowcharts of FIGS. 5 and 6. It should be noted that FIGS. 5 and 6 show only the portions associated with the use of the converting block 17 among the processing operations to be performed by the CPU 3.

In the memory read process shown in FIG. 5, first it is determined in step S61 whether the converting block 17 is available. This decision is made based on the state of the in-use flag provided in the RAM 9. If the converting block 17 is unavailable, namely the converting block 17 is in use by the concurrently operating facsimile transmission process (step S61: NO), the process waits without change in step S61. When the converting block 17 is made available (step S61: YES), the process goes to step S62. In step S62, the in-use flag indicating that the converting block 17 is in use is set to a predetermined area of the RAM 9. In step S63, the image data read by the image scanner 13 is coded and stored in the accumulation memory 9D. Then, in step S64, coding begins and it is determined whether 1 ms has passed. If 1 ms has passed (step S64: YES), then in step S65, the in-use flag is reset. When the in-use flag is reset, the facsimile transmission processing shown in FIG. 6 begins as described below.

If 1 ms has not passed in step S64 (S64: NO), it is determined whether all of the image data read by the image scanner 13 has been coded. If all of the image data has been coded (step S66: YES), the process ends. When this process ends, only the facsimile transmission process shown in FIG. 6 is made continuously executable. If all of the image data has not been coded (step S66: NO), the process goes back to step S63 to continue image data coding.

As shown in FIG. 5 and with reference to FIG. 6, the facsimile transmission process concurrently performed with the memory read process is described below. In step S71, the process waits until the converting block 17 in use by the concurrently operating memory read process becomes available. As described above, when the in-use flag is reset on the side of the memory read process in step S65, the converting block 17 becomes available for the facsimile transmission process. When the converting block 17 becomes available (step S71: YES), then in step S72, the in-use flag is set in the RAM 9. In step S73, the transmission data composed of transmission date, name of transmission source, and so on, is coded and attached to the facsimile data. In step S74, it is determined whether 15 ms has passed after setting the in-use flag. If 15 ms has passed (step S74: YES), the in-use flag is reset. When the in-use flag is set, the above-mentioned memory read process begins again.

If, in step S74, 15 ms has not passed (step S74: NO), then in step S76, it is determined whether all of the transmission data has been coded. If all of the transmission data has been coded (step S76: YES), the process ends. When this process ends, the memory read process shown in FIG. 5 is made continuously executable. If all transmission data has not been coded (step S76: NO), then the process goes back to step S73 to continue the coding of the transmission data. The facsimile data with the transmission data attached is transmitted to the destination facsimile according to the predetermined transmission protocol.

The control functions, as described above with reference to FIGS. 5 and 7, makes the time allocated to the facsimile transmission process longer than the time allocated to the memory read process when performing these processing operations concurrently.

It should be noted that when one of the concurrently performed processing operations is completed before the other (YES in step S66 or S76), the converting block 17 becomes available for the other process, so that coding for the other process can be performed continuously.

When the memory read and the facsimile reception processes are performed concurrently, they perform generally the same control function as that described in the flowchart in FIG. 6 for the facsimile reception process so that the time allocated to the facsimile reception process is longer than that allocated to the memory read process. In this case, instead of the coding process of step S73, the process for decoding facsimile data received over the telephone line may be performed.

Thus, in the facsimile apparatus 1 of the second preferred embodiment, the shared converting block 17 is used for coding or decoding in (1) the memory read operation, (2) the facsimile transmission, and (3) the facsimile reception processes. Further, when the memory read and the facsimile transmission or reception processes are performed concurrently, the converting block 17 can be alternately used between these processing operations. Therefore, although the facsimile apparatus 1 is of so-called dual access type, the manufacturing cost thereof can be reduced significantly. In addition, when the memory read and the facsimile transmission or reception processes are performed concurrently, the time allocated to the facsimile transmission or reception process is made longer than the time allocated to the memory read process. Therefore, the facsimile transmission or reception process can be given priority over the memory read process. This allows the coding or decoding processes to operate at the speed of the facsimile data transmission/reception. Consequently, the facsimile data transmission/reception is not disrupted despite sharing the use of the converting block 17.

In the second preferred embodiment, the facsimile transmission or reception process is given priority over the memory read process by allocating different time lengths to the facsimile transmission or reception process and the memory read process. It will be apparent to those skilled in art that the priority may be given by various other methods.

For example, if the memory read process and the facsimile transmission or reception process are alternately performed every time a predetermined quantity of data has been processed, a predetermined quantity of data allocated to the facsimile transmission or reception process may be made larger than that allocated to the memory read process to give priority to the facsimile transmission or reception process over the memory read process.

An example of priority processing using the above-mentioned method will be described as a third preferred embodiment of the invention. The structure of the facsimile apparatus practiced as the third preferred embodiment is generally the same as those of the facsimile apparatuses of the first and second embodiments shown in FIG. 1 and therefore the description of the structure of the third preferred embodiment will be omitted. The facsimile apparatus of the third preferred embodiment differs in the control method used for the facsimile apparatuses of the first and second embodiments. The control method performed by the facsimile apparatus of the third preferred embodiment is described below.

In the facsimile apparatus of the third preferred embodiment, (1) the memory read operation, (2) facsimile transmission, and (3) facsimile reception processes are performed like the facsimile apparatuses of the first and second embodiments.

In the third preferred embodiment, an example in which the memory read and the facsimile reception operations are performed concurrently will be described with reference to the flowcharts of FIGS. 8 and 9.

Figure 8:
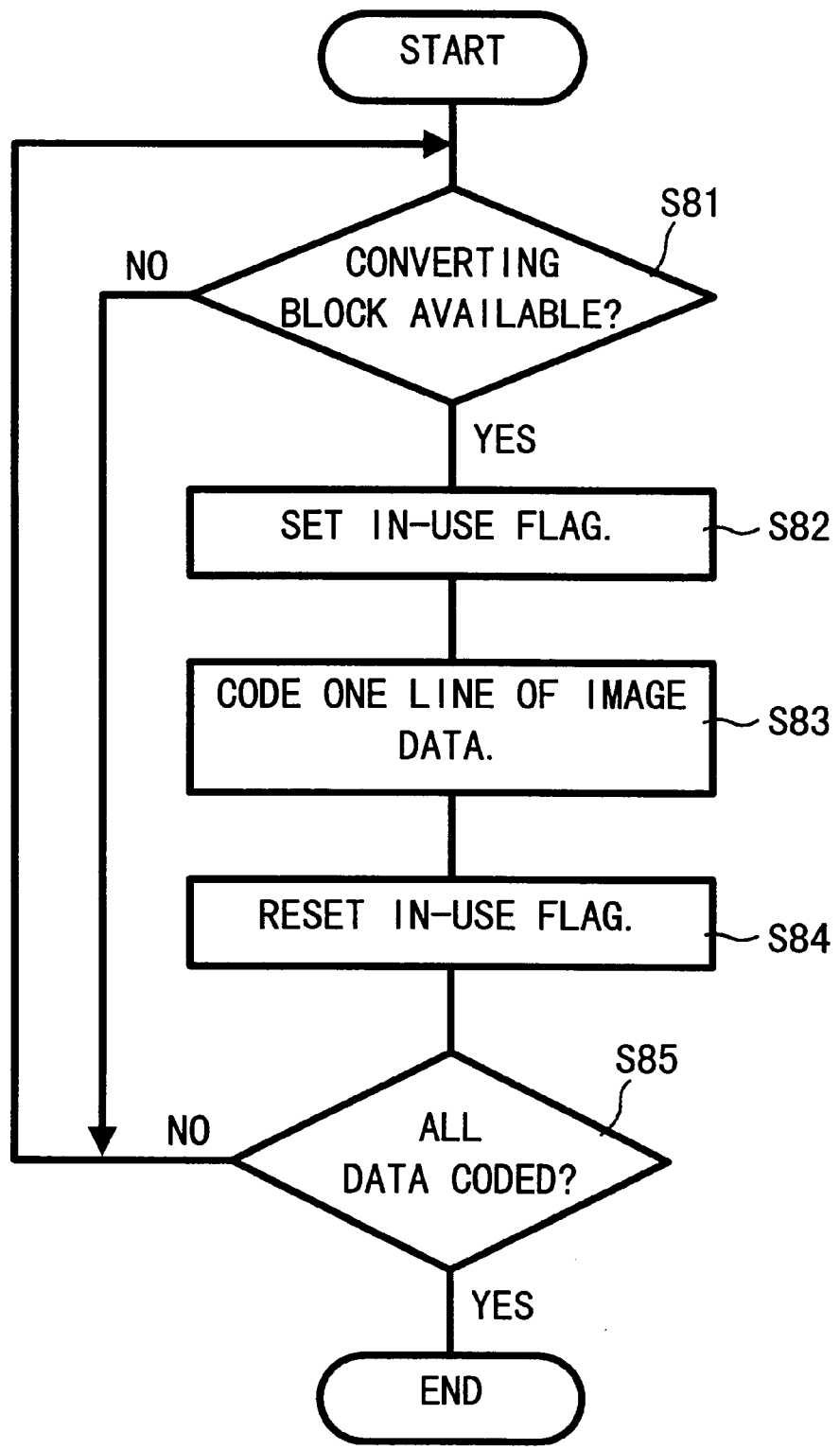
FIG. 8 is a flowchart of the memory read process in a third preferred embodiment of the invention.
Figure 9:
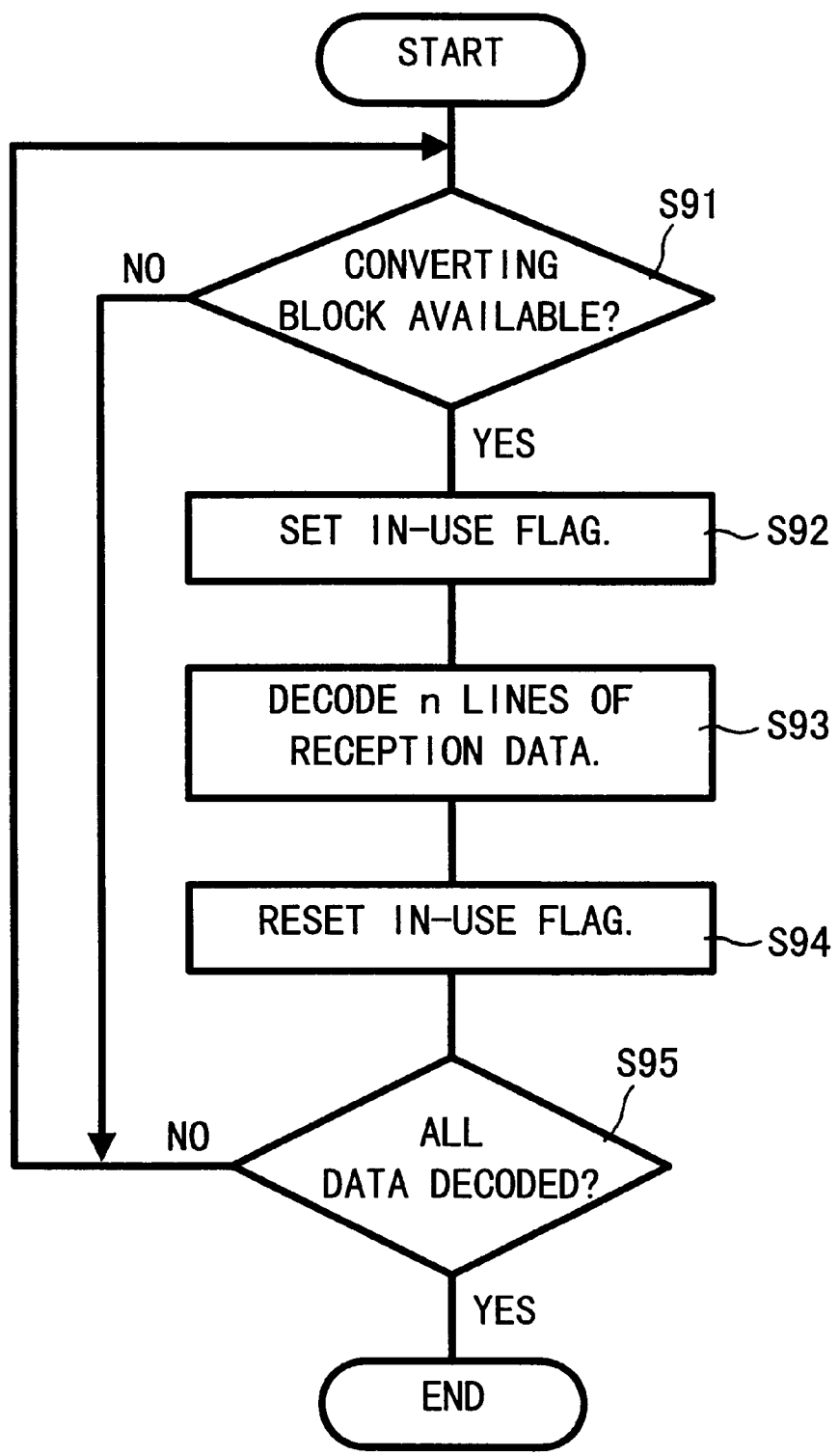
FIG. 9 is a flowchart of the facsimile reception process in the third preferred embodiment of the invention.

When the memory read and the facsimile reception operations are performed concurrently, the CPU 3 executes the processing operations shown in FIGS. 8 and 9 in a multitask manner. It should be noted that this multitask processing is performed with switching times sufficiently shorter than the multitask processing of the second preferred embodiment.

In the memory read process shown in FIG. 8, first it is determined in step S81 whether the converting block 17 is available. This decision is made based on the state of the in-use flag set in the RAM 9. If the converting block 17 is unavailable, namely the converting block 17 is in use by the concurrently operating facsimile reception process (step S81: NO), the process waits without change in step S81. When the converting block 17 is available (step S81: YES), the process goes to step S82. In step S82, the in-use flag indicating that the converting block 17 is in use is set in a predetermined area of the RAM 9. In step S83, one line of image data read by the image scanner 13 is coded and stored in the accumulation memory 9D. In step S84, the in-use flag is reset and then, in step S85, it is determined whether all of the document data has been coded. If all of the document data has not been coded (step S85: NO), then back in step S81, the above-mentioned processing operations (of steps S81 through S84) are repeated. When all of the document data has been coded (S85: YES), the memory read process ends.

In the facsimile reception process shown in FIG. 9, after a call has been terminated, communication is established with the source facsimile apparatus by transmitting/receiving signals of a predetermined protocol. Then, the facsimile reception operation starts. In this process, the in-use flag set in the RAM 9 is checked and the process waits until the converting block 17 becomes available (step S91). When the converting block 17 becomes available (step S91: YES), then in step S92, the in-use flag is set. In step S93, n lines of facsimile data received over the telephone line is decoded and stored in the image buffer 9C. In step S94, the in-use flag is reset. It should be noted that n is an integer of 2 or higher, and may be set from the operator panel, for example.

Next, in step S95, it is determined whether the facsimile data has all been decoded. To be specific, it is determined whether any facsimile data that has not been decoded remains in the reception buffer 9B. If all of the received facsimile data has not been decoded (step S95: NO), then in step S91, the above-mentioned processing operations (steps S91–S94) are repeated until all of the received facsimile data is decoded. When all of the received facsimile data has been decoded (step S95: YES), the process ends.

When the memory read and the facsimile reception processes are performed concurrently, while one process is performing coding or decoding (step S83 or S93), the other processing is kept in a standby state (step S81 or 91: because the in-use flag is set). Therefore, when the in-use flag is reset after one line of coding in step S83 is complete, it is determined in step S91 that the converting block is available. Then, in step S93 decoding begins. When the in-use flag is reset in step S94 after n lines of received facsimile data has all been coded in step S93, coding of one line of data begins again. Therefore, the memory read process for one line and the facsimile reception process for n lines can be alternately performed.

If the above-mentioned processing operations are performed, coding in the memory read process and decoding in the facsimile reception process can be performed by one converting block 17, thereby significantly reducing the manufacturing cost of the facsimile apparatus.

The facsimile reception process has preference over the memory read process since the facsimile reception operation is performed for n lines while the memory read process is performed for one line. This allows the decoding process to operate at the speed of the facsimile data reception. Consequently, although the converting block 17 is shared by both processing operations, the facsimile data reception operation is not disrupted. Further, in this third preferred embodiment, processing priority is dictated by giving different data processing quantities, thereby maintaining the data processing quantity balance at a proper level and enhancing the processing reliability.

In this third preferred embodiment, an example in which the memory read and the facsimile reception processes are performed concurrently has been shown. It will be apparent that the similar control can be performed when the memory read and the facsimile transmission processes are performed concurrently. In this case, the process for coding n lines of transmission data may be performed instead of the decoding process of step S93 shown in FIG. 9.

As described, according to the third preferred embodiment, if the data formed on document is complicated and therefore takes very long for processing data of a predetermined quantity (for example, one line of data), when a time (for example, 16 ms switching time) allocated to this processing passes, the other processing begins. Therefore, the process can be performed with reliability.

Further, in the third preferred embodiment, since the data processing quantity balance can be maintained at a proper level for each process, the reliability of the processing operations can be enhanced by smoothly switching between these processing operations through a well divided data processing quantity.

While the embodiments of the present invention have been described using specific terms, such description is for illustrative purposes only, and it is to be understood that changes and variations may be made without departing from the spirit or scope of the appended claims.

For example, if two types of dual access, such as the memory read and the facsimile transmission processes and the memory read and the facsimile reception processes, are executable, only one of the two types may be executed.

What is claimed is:

1. A facsimile apparatus comprising:
 a document data converter that converts document data into facsimile data for communication;
 a storage device that stores the facsimile data;
 a transmission data attaching device that converts data associated with a status of a facsimile transmission into facsimile data and attaches the converted data to the facsimile data stored in the storage device at the time of transmission of the facsimile data; and
 a shared converting device that performs data conversion for the document data converter and the transmission data attaching device when the document data converter and the transmission data attaching device operate simultaneously.

2. The facsimile apparatus of claim 1, wherein the document data converter and the transmission data attaching device alternate using the shared converting device.

3. The facsimile apparatus of claim 2, wherein the transmission data attaching device has priority for using the shared converting device when the shared converting device is being used alternately by the document data converter and the transmission data attaching device.

4. The facsimile apparatus of claim 3, wherein the shared converting device is used to process data of a predetermined quantity.

5. The facsimile apparatus of claim 4, wherein the predetermined quantity of data allocated to the document data converter is smaller than the predetermined quantity of data allocated to the transmission data attaching device, thereby providing a priority for the transmission data attaching device.

6. The facsimile apparatus of claim 5, wherein the predetermined quantity is one line.

7. The facsimile apparatus of claim 3, wherein the shared converting device is used alternately for a predetermined time.

8. The facsimile apparatus of claim 7, wherein the predetermined time allocated to said document data converter is shorter than the predetermined time allocated to said transmission data attaching device, thereby providing a priority for the transmission data attaching device.

9. A facsimile apparatus comprising:
 a document data converter that converts document data into facsimile data for communication;
 a storage device that stores the facsimile data;
 reception data converter that receives and converts facsimile data into image data for printing; and
 a shared converting device that performs data conversion for the document data converter and the reception data converter when the document data converter and the reception data converter operate simultaneously.

10. The facsimile apparatus of claim 9, wherein the document data converter device and the reception data converter alternate using the shared converting device.

11. The facsimile apparatus of claim 10, wherein the reception data converter has priority for using the shared converting device when the shared converting device is being used alternately by the document data converter and the reception data converter.

12. The facsimile apparatus of claim 11, wherein the shared converting device is used to process data of a predetermined quantity.

13. The facsimile apparatus of claim 12, wherein the predetermined quantity of data allocated to the document data converter is smaller than the predetermined quantity of data allocated to the reception data converter, thereby providing a priority for the reception data converter.

14. The facsimile apparatus of claim 13, wherein the predetermined quantity is one line.

15. The facsimile apparatus of claim 11, wherein the shared converting device is used alternately for a predetermined time.

16. The facsimile apparatus of claim 15, wherein the predetermined time allocated to said document data converter is shorter than the predetermined time allocated to said reception data converter, thereby providing a priority for the reception data converter.

17. A facsimile apparatus comprising:
 document data converting means for converting document data into facsimile data for communication;
 storage means for storing the facsimile data;
 transmission data attaching means for converting data associated with a status of a facsimile transmission into facsimile data and attaching the converted data to the facsimile data stored in the storage means at the time of transmission of the facsimile data; and shared converting means for performing data conversion for the document data converting means and the transmission data attaching means when the document data converting means and the transmission data attaching means operate simultaneously.

18. The facsimile apparatus of claim 17, wherein the document data converting means and the transmission data attaching means alternate using the shared converting means.

19. The facsimile apparatus of claim 18, wherein a predetermined quantity of data allocated to the document data converting means is smaller than a predetermined quantity of data allocated to the transmission data attaching means, thereby providing a priority for the transmission data attaching means.

20. The facsimile apparatus of claim 19, wherein a predetermined time allocated to said document data converting means is shorter than a predetermined time allocated to said transmission data attaching means, thereby providing a priority for the transmission data attaching means.

* * * * *